Sept. 2, 1952   G. STARRE ET AL   2,608,744
METHOD AND DEVICE FOR POSITIONING ELECTRODES
AND OTHER TUBULAR ELEMENTS
Filed Dec. 6, 1947
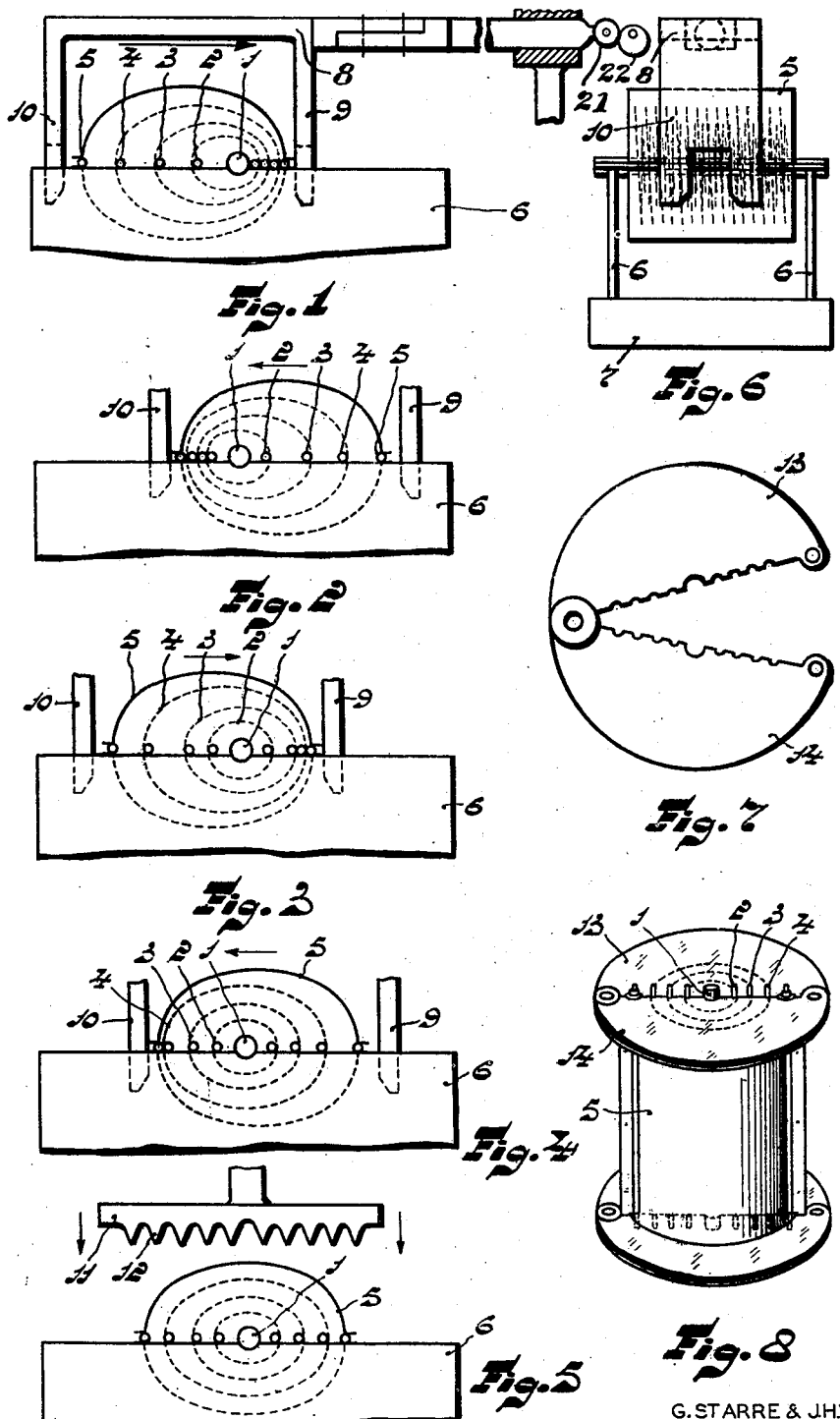
G. STARRE & J.H.V.D.BERGE
INVENTORS
AGENT Patented Sept. 2, 1952

2,608,744

UNITED STATES PATENT OFFICE 2,608,744

METHOD AND DEVICE FOR POSITIONING ELECTRODES AND OTHER TUBULAR ELEMENTS

Gerrit Starre and Jan Hendrik van den Berge, Eindhoven, Netherlands, assignors to Hartford National Bank and Trust Company, Hartford, Conn., as trustee Application December 6, 1947, Serial No. 790,100
In the Netherlands October 19, 1946

Section 1, Public Law 690, August 8, 1946
Patent expires October 19, 1966

8 Claims. (Cl. 29—25.13)

The invention relates to a method of and device for relative positioning of objects, more particularly electrodes for use in an electric discharge tube, which surround one another at least partly. The invention relates in addition to an object, for example an electric discharge tube, manufactured with the use of such method and device.

It is frequently necessary for objects, for example electrodes for use in electric discharge tubes, condensers, or the like, which surround one another at least in part, to be positioned relative to one another. This is often effected by shifting the objects by hand until the desired position is reached. If, however, such arrangement is required to be achieved mechanically difficulties arise, since imitation of the manual movements involves highly complicated constructions and so mechanical mounting of, for example, electrode systems for electric discharge tubes has not yet been carried out successfully in practice. An essential step in such mounting is the correct relative positioning of the objects or electrodes, so as to enable the arrangement of fixing members after the said objects have been arranged, at least in part, so as to surround one another loosely.

A simple method of positioning loose objects surrounding one another at least partly is obtained, according to the invention, by shifting the objects back and forth transversely to their direction of length with amplitudes decreasing in such manner that the objects, starting with the central one, successively reach the desired relative positions, after which they are fixed in position relatively to one another. For this purpose the objects are preferably supported by at least two stay edges extending transversely to the direction of length of these objects.

If the objects possess stay rods, as for example in the case of electrodes for use in a discharge tube, they preferably bear by means of these rods on the said edges, but as an alternative, it is possible for cylindrical objects arranged to surround one another loosely to be arranged on corresponding edges of different heights, so that, if necessary, these objects may be positioned axially. Objects of excessive length may be cut to measure after having been fixed in position.

The method according to the invention has various advantages. Thus, for example, it is not necessary to touch the objects by hand and the device for shifting the objects back and forth may be constructed in a comparatively simple manner from a mechanical point of view. It is furthermore possible to arrange one or more objects so as to be eccentric or slanting with respect to the others. The shifting operation may be effected by means of a forked arm, the objects becoming located between the teeth of the fork and being carried along and correctly positioned by the fork being shifted back and forth. Objects that may be suitable to be arranged in this manner in the correct relative position are, for example, electrodes for electric discharge tubes, concentric electrodes for condensers or the like. The objects may be of cylindrical, conical, oval-shaped, elliptical or otherwise shaped cross-section. Thus, for example, use may be made of semicylindrical electrodes.

In order that the invention may be more clearly understood and readily carried into effect, it will now be described more fully with reference to the accompanying drawing, in which one embodiment of the invention is shown and in which:

Figs. 1 to 5 show different positions of the electrodes of a discharge tube, which are correctly positioned relatively to one another by a method according to the invention, Fig. 6 is an elevation of the device, Fig. 7 shows a centering member and Fig. 8 a finished electrode system.

The objects arranged to surround one another loosely, in this case electrodes 1, 2, 3, 4 and 5, which are formed respectively as an indirectly heated cathode, three grids and an anode for use in a discharge tube, bear by means of the ends of the electrode supports, or the ends of the cathode respectively, on two edges 6, 6, which are secured to a mounting table 7 (Fig. 6).

According to the invention, the electrodes are shifted, by means of a forked arm 8 having teeth or transverse rods 9 and 10, towards one side, for example by the rod 9 actuated by a roller 21 riding on a cam 22, until all the electrodes engage one another (Fig. 1). In certain cases the ends of the cathode are caused to bear in a small recess of the edges 6. The arm 8 is then moved towards the other side, with the result that the electrodes 5, 4, 3 and 2 are successively moved into contact with one another, the amplitude of the sliding movement being so much smaller than with the first movement that the position shown in Fig. 2 is reached, grid 2 thus becoming located exactly in the desired position, in this case coaxially with the cathode 1. The electrodes are then again shifted by the rod 9 until the grid 3 is correctly positioned (Fig. 3), whereupon the electrodes 4 and 5 are arranged in the correct position. The electrodes are then centered and secured, for example, by means of a member 11, one edge of which is provided with teeth 12, which engage between the ends of the supporting wires, and are fixed in position by means of centering members adapted to be slipped over the ends of the supporting wires. After the toothed members have been removed, the said centering members are slightly shifted until the desired position with respect to the electrodes is obtained, whereupon these members may be secured in the usual manner to one or more supporting wires. However, use is preferably made of centering members as shown in Fig. 7, which comprise two halves 13 and 14, which may be pivotally attached to one another. Such centering members are adapted to be slipped from one side over the ends of the supporting wires or electrodes respectively, whereupon by interconnection of the said halves the electrodes are fixed in position with respect to one another and centered and may then be removed from the device in the form of an electrode-packet. Fig. 8 shows such an electrode-packet, which is adapted to be housed in a discharge tube.

The advantage of a method according to the invention is, as set out hereinbefore, that the electrodes need not be touched by the fingers if the arrangement of the electrodes so as to surround one another is also effected mechanically.

It is possible to arrange one or more electrodes or other objects so as to be eccentric with respect to one another by varying the amplitude of the shifting movement in a corresponding manner. It is also possible to arrange one or more electrodes to be slanting with respect to one another. For this purpose use may be made of a forked arm 8, 9, 10, which is divided longitudinally, so that properly speaking there are two adjacent forked arms. If these arms are adapted to move irrespective of each other, the amplitudes of the arms may be made different for the purpose of correctly positioning a given electrode, so that the electrodes shifted by reason of this movement become located so to be slanting with respect to the cathode. Subsequently, movement of both arms with equal amplitude permits of the other electrodes being again arranged so as to be coaxial with or excentric to the cathode, one electrode of the electrode system being thus finally arranged so as to be slanting with respect to the cathode.

It is furthermore possible to move the mounting table 7 with the edges 6, the arm 8 being stationary, whilst, if necessary, a combination of movements of arm and mounting table is possible. As an alternative, one or more electrodes may, for example, be trough-like or exhibit a rectangular or any other cross-section, or they may be conical or top-shaped or shaped into another form.

In addition, a favourable embodiment is obtained if the outer electrode of the system is not provided prior to shifting but subsequent thereto, this electrode, generally the anode, preferably consisting of two halves and half a centering member being adapted to be gripped at the ends of each anode half in an edge of this electrode. During the arrangement of the two halves of the outer electrode so as to surround the other electrodes, correctly positioned by shifting, and their attachment to one another, the supporting wires of the other electrode are gripped and maintained centered between the halves of the centering members secured to the halves of the outer electrode. The forked arm may be controlled by means of levers which bear on a cam. Instead of swinging on a shifting arm, the rods of the fork may swing about a spindle arranged above or below the objects, the objects being adapted to be shifted after the manner according to the invention.

What we claim is:

1. A device for arranging in predetermined relative positions a plurality of electrodes surrounding each other at least in part, said electrodes comprising projecting supporting members, which comprises a mounting means, two supporting edges on said mounting means having horizontal faces for receiving the projecting ends of said electrode supporting members so as to be slidable on said faces, pusher means, comprising a forked arm having two parts adapted to move independently of one another, said parts being capable of engaging the outermost of said electrodes, and cam means for imparting a reciprocating movement to the fork arm to thereby reciprocate the electrodes transversely to the direction of their length in a horizontal plane with decreasing amplitudes, whereby said electrodes successively reach the desired positions.

2. The method of positioning a plurality of electrode elements, that loosely successively surround one another around a central primary electrode having an axis, so the surrounding electrodes will be properly spaced and positioned for secural for use in an electron discharge tube, which consists in shifting the loose surrounding electrodes transversely of the axis of the central electrode to an extreme position against the central electrode, with the several loose electrodes progressively in engagement with the next adjacent electrodes, then shifting the loose electrodes in reverse direction with the outermost electrode successively and progressively engaging the next inner one of the loose electrodes to shift all the loose electrodes as a group, until the innermost loose electrode is shifted to desired locating position relative to the primary central electrode; then reshifting the loose electrodes except the already located innermost electrode, by laterally shifting the outermost loose electrode to progressively and successively engage the next inner electrodes except said located innermost electrode and to shift them as a group until the next-to-innermost electrode is shifted to desired position relative to the central electrode; then again reversely shifting the remaining electrodes until the innermost of the shifted group reaches desired position; and repeating such alternate shifting of the electrodes not yet positioned, until all the electrodes are successively shifted to their respective proper positions; and then rigidly securing the several electrodes in relative fixed position as a fixed assembly.

3. The method of assembling a plurality of electrodes as a packet for use as an electrode assembly in an electrode discharge tube, which consists in loosely assembling a set of electrodes around a cathode, with the electrodes already respectively provided with side supporting rods; disposing and supporting the cathode and the supporting rods of the surrounding electrodes horizontally on and across two horizontally spaced vertical supporting walls; shifting all the electrodes that surround the cathode in a first direction transverse to the cathode axis by engaging and shifting the outermost electrode from one side, to successively and progressively engage the next adjacent inner electrodes and to move the electrodes as a group to the ultimate inner position against the cathode then engaging the other side of the outermost electrode and shifting it back in the reverse direction to successively and progressively engage and shift the electrodes in a group until the innermost electrode is positioned at a desired position relative to the cathode; and then similarly reshifting the outermost electrode again in the first direction to engage and shift the unpositioned electrodes until the electrode next to the already positioned electrode is moved to and positioned at its proper position, spaced from the previously positioned innermost electrode; and repeating the shifting action alternately in the reverse and in the first-mentioned directions until each next outer electrode is shifted to its proper position relative to the next adjacent positioned inner electrode, until all the electrodes are properly spaced and positioned; and then suitably anchoring and fixing the several electrodes in their respective positions to maintain their spacing in a rigid package.

4. The method set forth in claim 3, in which one of the electrodes is positioned eccentrically with respect to the others, by shifting the group containing that electrode as the innermost one, in such manner that each electrode of that group is shifted in eccentric position until the innermost is positioned in desired eccentric position; then reshifting the other electrodes of that group in the reverse direction in proper parallel axial relation until the inner electrode of that reshifted group is moved to desired position; and continuing such reshifting until all the electrodes are positioned; and then securing the electrodes in such spaced positions.

5. The method set forth in claim 3, in which the cathode is suitably anchored against casual movement during the shifting operations of the surrounding electrodes.

6. The method of assembling a set of electrodes including a cathode and several control grids for use in an electron discharge tube, which consists in providing the grids with longitudinal side supports of greater respective lengths than the associated grids; positioning the cathode horizontally across and between two horizontally spaced vertical plates having horizontal top edges, with the grids loosely surrounding the cathode, and with the grid side supports similarly resting on the top edges of the vertical plates; then shifting the electrodes alternately in reverse transverse directions relative to the cathode axis, with each shifting movement being only of sufficient extent to progressively and consecutively position each grid, starting with the innermost; and then securing the electrodes in their relative positions.

7. The method set forth in claim 6, in which the shifting movement for positioning a predetermined electrode is performed to shift the movable group with the predetermined electrode at an angle to the cathode axis, so that electrode will be ultimately positioned eccentrically to the cathode axis.

8. Apparatus for mechanically assembling a set of electrodes for use in an electron discharge tube, where the electrodes are individually initially prepared with side stay rods, said apparatus comprising two horizontally spaced vertical plates having effectively parallel top edges, for supporting the side stay rods of a set of the electrodes loosely arranged to surround one another, thereby to support the electrode axes in a common plane; means for laterally shifting the loosely arranged electrodes in either transverse direction while their axes are kept in such common plane.

GERRIT STARRE.
JAN HENDRIK VAN DEN BERGE.

REFERENCES CITED

The following references are of record in the file of this patent:

UNITED STATES PATENTS

| Number | Name | Date |
|---|---|---|
| 1,920,630 | Conn | Aug. 1, 1933 |
| 2,350,022 | Erber | May 30, 1944 |
| 2,411,184 | Beggs | Nov. 19, 1946 |